Dec. 18, 1928.
A. R. RUTTER ET AL
1,695,861
ELECTRICAL MEASURING INSTRUMENT
Filed Aug. 29, 1927
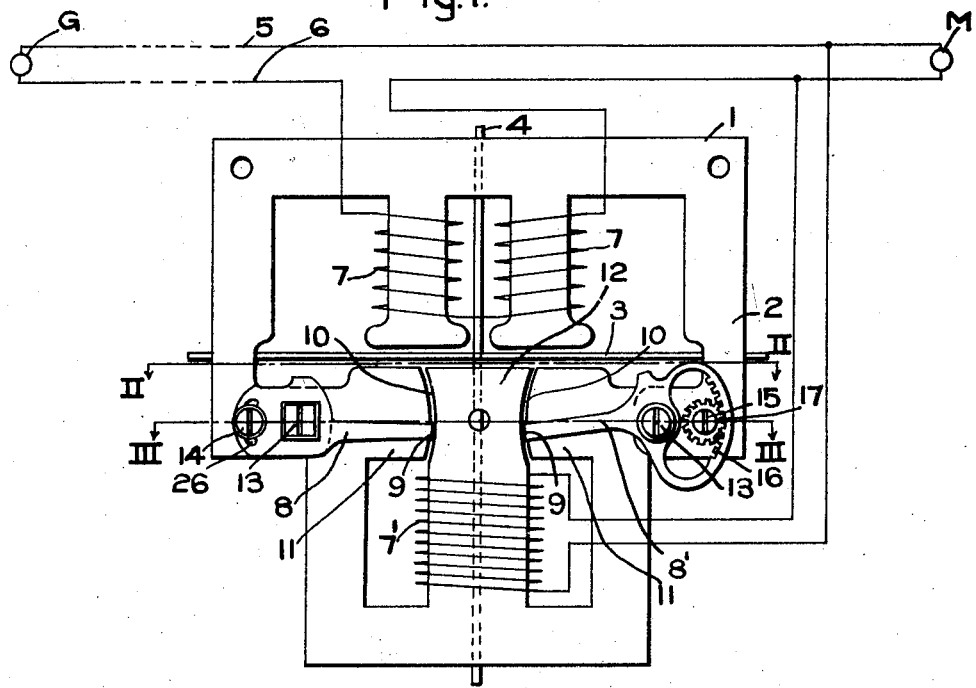
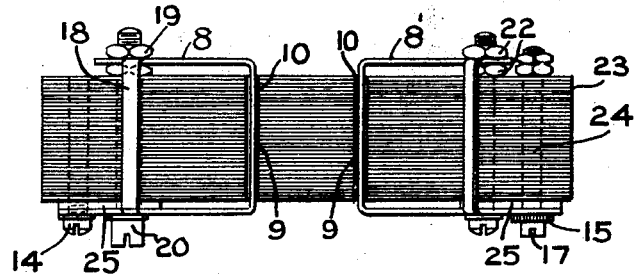
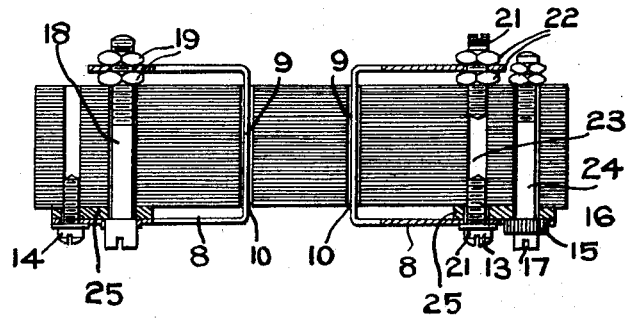
INVENTORS
Walter G Mylius and
Argyle Russell Rutter.
BY
*Wesley G. Carr*
ATTORNEY Patented Dec. 18, 1928.

1,695,861

UNITED STATES PATENT OFFICE.

ARGYLE R. RUTTER, OF FOREST HILLS, AND WALTER G. MYLIUS, OF WILKINSBURG, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

Application filed August 29, 1927. Serial No. 216,292.

Our invention relates to electrical measuring instruments and particularly to light-load adjusting devices for such instruments.

Our invention resides in apparatus for minutely adjusting the light-load compensating device of an induction motor meter, and it is characteristic of our apparatus that it furnishes an extremely accurate and delicate adjustment for the angularly displaced cooperating fluxes utilizable for overcoming the friction and bearing load that is present in all induction motor meters.

It is further characteristic of our invention that we provide highly effective and convenient means for retaining the light-load adjustment mechanism in fixed position after adjustment.

In a watthour meter of the usual type, a core is provided with a plurality of spaced pole pieces for receiving, respectively, windings adapted to be energized in accordance with the values of current and voltage existing in the circuit with which the meter is associated. A disc armature is disposed between the pole pieces in such manner that rotation of the disc is effected in accordance with the flux set up by said windings.

In accordance with our invention, we provide a plurality of closed-circuit members that are pivotally mounted on the core member of a watthour meter in a position to affect the rotation of the armature of the meter by the interaction of the voltage flux with flux generated in the closed-circuit members by the voltage flux. Means are provided, further, whereby movement of the closed-circuit members, to vary the effect thereof upon the armature, may be effected in very small increments.

Our invention resides in the apparatus hereinafter described and claimed, the foregoing and further characteristics of our invention being determinable from the following description.

For an understanding of a form our apparatus may take reference is to be had to the accompanying drawings, in which Figure 1 is a view in elevation of a portion of an electrical measuring instrument embodying our invention, Fig. 2 is a view, partially plan and partially cross sectional, of a portion of the instrument shown in Fig. 1, taken along the line 11—11, and Fig. 3 is a view similar to Fig. 2 taken on the line 111—111 of Fig. 1.

An electrical measuring instrument 1 comprises a magnetizable core member 2 and an armature 3 that is adapted to rotate a shaft 4 in accordance with the magnitude of an electrical quantity, such as the power traversing an electrical circuit comprising the conductors 5 and 6. To this end, there coacts with the armature 3 the fluxes induced in one or more current windings 7 and a voltage winding 7' connected, respectively, in series circuit relation and across the aforesaid circuit comprising the conductors 5 and 6. The latter constitute a suitable electrical circuit that is adapted to transmit an electrical quantity from a source of electrical energy, such as an alternating current generator G to a receiver of such electrical energy, such as an alternating current motor M.

The armature 3 drives an indicating or integrating device (not shown) in the usual well known manner to record the total amount of power traversing the conductors 5 and 6. The usual permanent magnet for damping the disc 3 is provided, but has been omitted from the drawing to more clearly illustrate the primary feature of our invention.

In order that the friction, particularly at light loads, between relatively movable parts of the instrument may not cause inaccurate registration of the amount of energy traversing the conductors 5 and 6 during a specific interval of time, we provide a compensating means which comprises a plurality of closed coils 8 and 8' consisting, preferably of a single loop of proper dimensions and suitable conducting material, preferably non-magnetic in character, as brass or the like. Portions 9 of the aforesaid coils 8 and 8' are movable, respectively, in air gaps 10 disposed between the projections 11 and the pole piece 12 of the core member 2. The coils 8 and 8' are each pivotally supported at 13; the former is provided with a locking set screw 14 while the latter is provided with speed reducing mechanism, as hereinafter described.

The flux produced by the coil 7' cuts the loops 8, 8' and induces currents therein whereby, in turn, there are produced fluxes angularly related to the flux produced by coil 7'. The sets of flux thus produced react with the armature 3 and, when said loops 8, 8' are positioned different distances therefrom, cause different magnetizing effects on opposite sides of the pole piece 12. Accordingly, by proper adjustment of the loops 8, 8' the effect of friction may be largely or entirely overcome and the armature 3 caused to rotate at substantially constant speed, at light load as well as at heavier loads.

In accordance with our invention, suitable mechanism is utilized for adjusting one of the aforesaid loops 8 or 8' by very small increments. As one example of such mechanism, there is provided a gear wheel 15, preferably accessible from the exterior of the meter casing and suitably mounted on the core member 2 to cooperatively engage a gear segment 16 formed on a member comprised in the loop 8'. Gear wheel 15 is provided with a slotted portion 17, which when engaged with a suitable tool, such as a screw driver, changes the position of the loop 8' with respect to the air gap 10.

As stated above, the conducting member 8 is pivoted at 13 and this connection comprises a tap bolt 18 that is rotatably disposed in a suitable hole provided in the core member 2. One end of member 8 is disposed between the shouldered end of bolt 18 and a plate 25 and the other end thereof is mounted between nuts 19. Said one end of member 8 comprises a polygonal flange portion coacting with a similarly shaped bolt head 20 of the bolt 18. When it is desired to adjust the member 8, the set screw 14 is loosened and the bolt head 20 is turned to move the loop 8 in the proper direction, an arcuate slot 26 permitting rotational movement of the member 8. The loop 8 is locked in position after adjustment by tightening the set screw 14.

As stated above, the loop 8' is pivoted at 13 and, in the example illustrated, this connection comprises a pair of pivot screws 21 threaded into opposite faces of the core member 2. One of the aforesaid pivot screws 21 is provided with a head, between which and a space plate 25, one end of the loop 8' is disposed. The other pivot screw 21 has secured thereto a plurality of nuts 22 between which the other end of loop 8' is mounted. By preference, the gear wheel 15 comprises a shaft 24 suitably retained in a passage extending through the magnetizable structure 2.

To effect adjustment of the loop 8', the lower screw 21 of Fig. 3, may be slightly retracted whereupon the gear 15 may be rotated by application of a screw driver or similar tool to the slot 17. Due to the gear mechanism illustrated, relatively great movement of gear 15 results only in relatively slight movement of loop 8'. Hence, the relation of said loop 8' with respect to the core 2 may be adjusted with precision and nicety, thereby regulating the speed characteristics of armature 3 in a similar manner. Thereafter, the lower screw 21, of Fig. 3, may be tightened to positively retain loop 8' in the position to which moved.

It shall be understood that, in lieu of the gear mechanism herein described for effecting movement of the loop 8', there may be utilized generally equivalent arrangements. Thus, for example, the member in which the loop 8' terminates may be provided with a gear segment with which a worm is adapted to mesh, the worm functioning similarly to the herein disclosed gear wheel 15.

We claim as our invention:

1. In an alternating-current-motor meter, the combination with a magnetizable core having a central member and a side member separated therefrom by an air gap, of a closed-circuit conductor comprising a portion movable in said air gap, an extension integral with said conductor and constituting a gear rack, and a pinion operatively engaging said gear rack.

2. The combination with a magnetizable core having members separated by an air gap, of a closed-circuit conductor comprising a portion movable in said air gap, means for moving said conductor with respect to said core comprising a gear segment carried by said conductor and a pinion mounted upon said core and operatively engaging said segment, and means for retaining said conductor in an adjusted position.

In testimony whereof, we have hereunto subscribed our names this 24th day of August, 1927.

ARGYLE R. RUTTER.
WALTER G. MYLIUS.